Nov. 26, 1929.   O. R. SWEENEY   1,736,890
WATER SOFTENER BRINE TANK
Filed Dec. 30, 1925

Inventor.
Orland Russell Sweeney
By Wilson & McCanna
Attys

Patented Nov. 26, 1929

1,736,890

UNITED STATES PATENT OFFICE

ORLAND RUSSELL SWEENEY, OF AMES, IOWA, ASSIGNOR TO WARD-LOVE PUMP CORPORATION, OF ROCKFORD, ILLINOIS, A CORPORATION OF ILLINOIS

WATER-SOFTENER BRINE TANK

Application filed December 30, 1925. Serial No. 78,283.

This invention relates to a brine tank for use in connection with zeolitic water softeners.

Water softeners operating by the so-called base-exchange process are reconditioned or regenerated from time to time by the passing of salt water or brine through the zeolitic material. In the case of small plants, such as are in domestic use, the operation of reconditioning is usually conducted by merely pouring in a certain amount of the salt or brine, but in the case of larger plants, such as are used in laundries, hotels and in the industries, it becomes necessary to provide for proportionately larger amounts of brine for the regenerating operations. For this purpose a sale or brine tank of the type contemplated by the present invention is required.

Such tanks contain a provision for bringing salt and water in contact to get the water nearly saturated with the salt. If the salt is merely poured into the tank it settles directly to the bottom and since the specific gravity of the solution is greater than that of the fresh water, it is evident that the salt solution or brine merely forms a layer on the bottom of the tank and does not give the less dense fresh water above it a chance to commingle with the salt. As a result, the contents of the tank will consist of a layer of salt covered with a layer of saturated solution and above this fresh, or nearly fresh, water. This method is impractical without the use of mechanical circulation or agitation which has been practiced heretofore at considerable cost and trouble. Screens have been used in horizontal position for supporting a bed of salt in elevated relation in a brine tank. But this method proved inefficient due to the great friction encountered by the water in passing up through the salt or by the solution traveling down. Vertical screens also were used in brine tanks forming a salt compartment at one side of the tank. These proved inefficient because friction prevented the saturated solution from entering the brine compartment through the screen and there was virtually no circulation except in the salt compartment.

According to the present invention, I provide a brine tank capable of producing brine in the quantities required and easily within the time allowed using a screen positioned in inclined relation within the tank which has proved very efficient by virtue of the fact that it induces a natural circulation in the tank resulting from the displacement of less dense solution by denser or saturated solution.

Another important object of the invention, in addition to the provision of a tank construction adapted for the accomplishing of the foregoing object, consists in the provision of means for keeping the tank and the brine clear of trash and refuse that might be introduced with the salt when the tank is filled.

Other objects and advantages of the invention will appear more fully in the course of the following detailed description which makes reference to the accompanying drawing, wherein—

Throughout the views the same or similar reference numerals are applied to corresponding parts.

Figure 2:
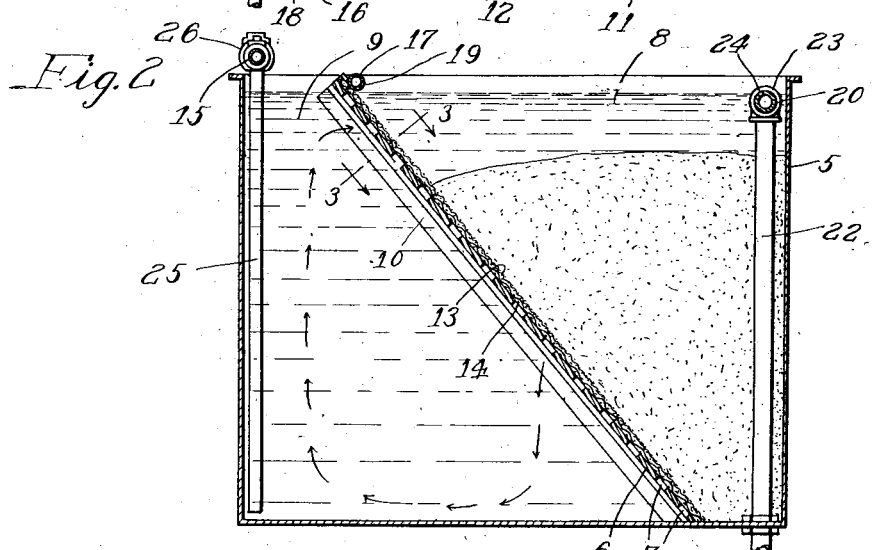
Fig. 2 is a longitudinal vertical section through the tank showing the same filled with salt and water for the production of brine solution.

The tank comprises a receptacle 5 of rectangular, or other suitable or convenient form, open at the top preferably, and conveniently made of sheet metal. A partition or diaphragm 6 of sheet metal having numerous openings 7 therein, is mounted in the tank crosswise thereof and inclined to any position intermediate vertical and horizontal, but preferably at about 45° or 50° to the horizontal as shown. The partition 6 divides the tank into a salt storage compartment 8 and a brine compartment 9 and is supported suitably on angle irons 10 welded, or otherwise suitably secured, to the opposite sides of the tank on the inside thereof. Screws 11 are provided for securing the partition to its supports and strips 12, held by the same screws, clamp a sheet 13 of relatively fine mesh screen or gauze together with another sheet 14 of relatively coarse screen in position over the partition 6. The storage compartment 8 is in the nature of a bin or pocket at the one side of the tank into which the salt is poured substantially as shown in Fig. 2. The salt is retained by the relatively fine screen 13 and supported by the relatively coarse screen 14 and, of course, by the partition 6. The water in the tank is, of course, free to pass through the openings 7 and through the screens 13 and 14 for contact with and passage through the salt.

In operation the water, which for the present it will be assumed is filled to the level indicated in Fig. 2, on becoming saturated with salt in the compartment 8 sinks with relation to the less dense solution or fresh water through the screens 13 and 14 and openings 7 as indicated by the small arrows in Fig. 2. The downward circulation of the more dense solution naturally displaces the fresh water or less dense solution along the lines of the horizontal arrows and a rising current of fresh water or less dense solution occurs along the far side of the tank substantially as shown, the rising current being naturally induced to flow from the brine compartment 9 over into the salt compartment 8 as the fresh water or less dense solution is continuously displaced by a denser solution and as the saturated or denser solution continuously has downward circulation through the salt in the compartment 8. This naturally induced circulation commences the moment any of the salt is taken into solution and continues so long as any difference in the density of the solution exists in the tank, that is, until the entire solution present is saturated or substantially so. By virtue of this fact, much smaller tanks than were heretofore required can be used to serve a softener of a given capacity and there is a consequent saving in the original cost and in the floor space taken up by the plant and its accessories. The near saturation of the solution is also produced in the shortest possible time, easily within the length of time allowed between regenerating operations, and, of course, at no cost to the user such as was involved with the use of mechanical devices heretofore.

Figure 1:
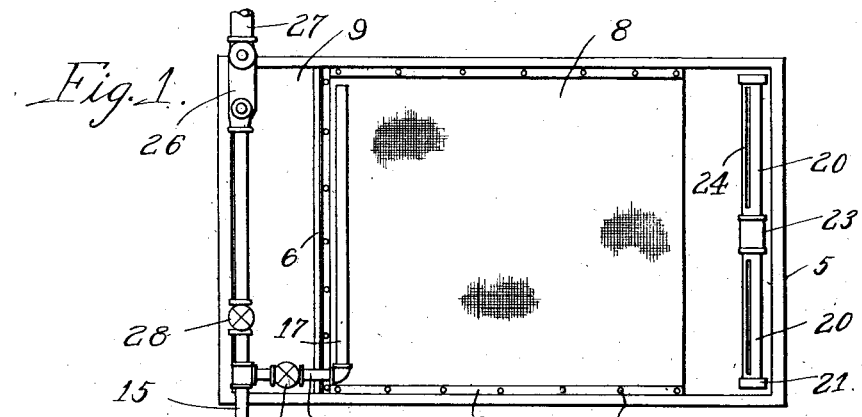
Fig. 1 is a plan view of a brine tank constructed in accordance with the invention.

The fresh water is supplied to the tank through a pipe 15 leading to the city water mains. A branch 16 connects a filling and flushing pipe 17 with the supply pipe 15 through a valve 18. The pipe 17 extends crosswise of the tank, as shown in Fig. 1, along the top of the partition 6 within the salt storage compartment 8. It is provided with a number of discharge openings 19 lengthwise thereof to throw the water substantially uniformly over the bed of salt in the compartment 8. In practice a definite level of water is maintained in the tank by the provision suitably of a float mechanism which it will not be necessary to illustrate or describe. An overflow and drain pipe 20, preferably consisting of two branches capped at the outer ends thereof, as indicated at 21, is provided at the opposite side of the storage compartment from the pipe 17 and in parallel relation thereto. A standpipe 22 supports the drain pipe 20 on a T connection 23 and leads out through the bottom of the tank as shown. Each of the branches of the pipe 20 has a slot 24 extending lengthwise thereof at the level to which the water in the tank is to be kept. When the tank is refilled with salt thoroughly saturated and somewhat agitated of course, a certain amount of trash and refuse is found to collect on the surface of the water in the salt storage compartment 8. This is flushed off by several swishing sprays from the openings 19 in the pipe 17 after which the water is turned off by means of the valve 18.

A brine outlet pipe 25 extends from a point near the bottom of the tank in the brine compartment 9 up to the lower side of an injector fitting 26 which leads through a pipe 27 to the water softener served by the brine tank. A valve 28 in the supply pipe 15 controls the flow of water through the injector fitting 26 into the water softener. By the injector action the brine is withdrawn from the tank through the pipe 25 along with the fresh water until a certain definite amount as been discharged as will be noted by the dropping in level of the brine in the tank. Usually a definite amount of brine is used on each regeneration or the regenerating operation is carried on until a certain predetermined time has elapsed which in practice is found sufficient for the regeneration of a softener of a given capacity.

Figures 3, 4:
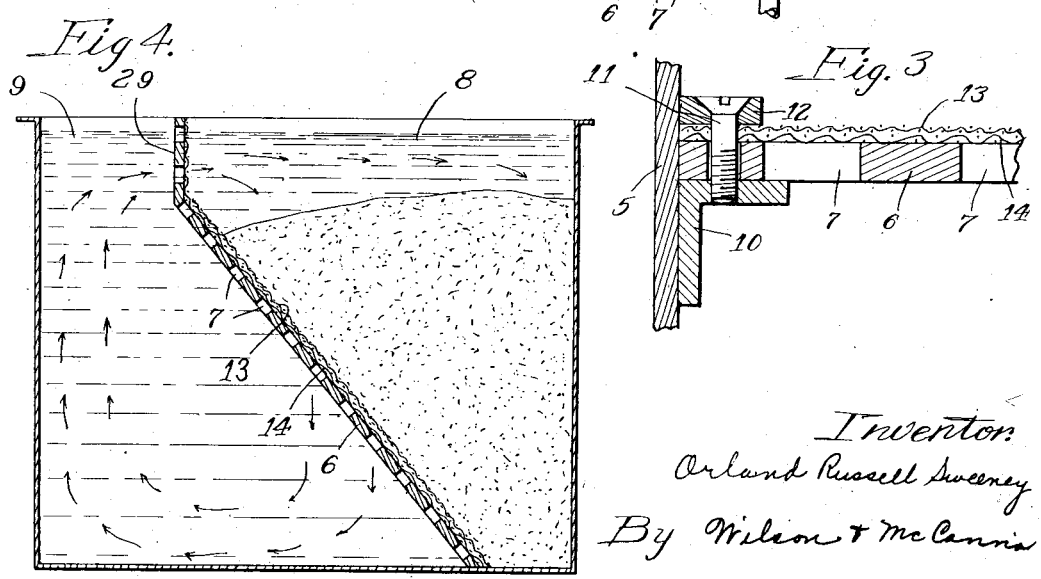
Fig. 3 is an enlarged fragmentary sectional detail taken on the line 3—3 of Fig. 2.
Fig. 4 is a view similar to Fig. 2 showing a modification in the construction.

In the modification of the invention illustrated in Fig. 4, the partition 6 extends in inclined relation to a point short of the top of the tank where a vertical portion 29 is provided suitably integral therewith. The openings 7 are provided in both the vertical and inclined portions of the partition. It will be noted, however, that the fine screen 13 terminates at the vertical portion 29 leaving only the coarse screen 14 covering the vertical portion to separate the compartment 8 from the compartment 9. These provisions are made with a view to avoiding the possibility of a deflection of the crosswise current at the top of the tank downwardly along the partition instead of passing from the compartment 9 into the compartment 8 to circulate back, over and down through the salt. For this reason the resistance to the flow of the solution is reduced at the point in question and the wall given no inclination so that there can be no tendency for a deflection of the current off the desired course. The elimination of the fine screen at the point referred to works no harm since the salt poured into the compartment 8 is never filled up to such a level. It is, however, necessary to have at least the coarse screen present at the point referred to to avoid getting any of the trash or refuse accumulating in the brine compartment 8 in the compartment 9 from which it would be drawn into the water softener.

It is believed that the foregoing description is sufficiently clear and complete to afford enough of an understanding of the purposes and operation of the present invention that anyone versed in the art and acquainted with the problems with which the present invention deals could make and use the invention to good advantage.

I claim:

1. In a tank of the character described comprising a liquid receptacle, a salt compartment therein formed by a sloping diaphragm extending from side to side of the receptacle, said diaphragm being of foraminous material to permit of the passage therethrough of the liquid but serving to retain the salt, the upper portion of said diaphragm being substantially vertical.

2. In a tank of the character described comprising a liquid receptacle, a pocket for retaining salt formed at one side of said receptacle between the side thereof and a sloping diaphragm extending crosswise of said receptacle, said diaphragm having a vertical upper extremity.

3. In a tank of the character described comprising a liquid receptacle, a perforate partition extending crosswise in said receptacle in inclined relation to the bottom thereof dividing said receptacle into a salt storage compartment and a brine compartment, said partition extending from the top to the bottom of said receptacle with the top portion thereof extending vertically, a coarse screen diaphragm covering said partition from the top to the bottom thereof and a fine screen diaphragm over the coarse one extending from the bottom of said partition short of the top thereof.

4. In a tank of the character described comprising a liquid receptacle, a diaphragm forming a partition within said receptacle to provide a brine compartment and a salt storage compartment, a liquid filling pipe emptying in said last mentioned compartment, said filling pipe extending crosswise of said storage compartment and having a series of discharge openings therein lengthwise thereof for delivering streams crosswise of the top of said compartment, and a refuse drain and overflow pipe at the opposite side of said compartment extending crosswise of the top thereof having an opening therein lengthwise thereof.

5. In a tank of the character described comprising a liquid receptacle, a perforate partition extending crosswise in said receptacle in inclined relation to the bottom thereof dividing said receptacle into a salt storage compartment and a brine compartment, a coarse screen diaphragm covering said partition from top to bottom, and a fine screen diaphragm extending from the bottom of said partition to a point somewhat short of the top thereof.

In witness of the foregoing I affix my signature.

ORLAND RUSSELL SWEENEY.